United States Patent [19]
Chiaffredo et al.

[11] Patent Number: 5,441,877
[45] Date of Patent: Aug. 15, 1995

[54] SUBSTRATE CONTAINING CYANOPHYCEA AND BRYOPHYTE PROTONEMAS FOR PRODUCING VEGETATION ON BARE TERRAIN

[76] Inventors: Michel Chiaffredo, Les Essarts, Pouilly le Monial, France, 69400; Claude Figureau, rue Stanislas Baudry, Nantes, both of France, 4400

[21] Appl. No.: 210,410

[22] Filed: Mar. 18, 1994

Related U.S. Application Data

[63] Continuation of Ser. No. 761,496, Sep. 18, 1991, abandoned.

[30] Foreign Application Priority Data

Sep. 18, 1990 [FR] France .................. 90 11714

[51] Int. Cl.⁶ .......... C12N 11/14; C12N 5/00; C12N 1/12; C12N 11/02
[52] U.S. Cl. .................. 435/176; 435/177; 435/180; 435/240.45; 435/240.54; 435/252.1; 435/257.1; 111/900
[58] Field of Search ............. 435/174, 177, 176, 180, 435/240.23, 240.45, 240.54, 252.1, 257.1; 111/900

[56] References Cited

U.S. PATENT DOCUMENTS 4,774,186  9/1888  Schaefer, Jr. et al. ............. 435/257

*Primary Examiner*—David M. Naff
*Attorney, Agent, or Firm*—Burns, Doane, Swecker & Mathis

[57] ABSTRACT

A biologically enriched substrate containing organic matter rich in colonies of Cyanophycea(cyano-bacteria, also called blue or green algae) and Bryophytes(moss) is prepared for rapid creation of natural vegetation on bare terrain. More specifically, the substrate contains 20-30% material rich in organic matter, 40-60% synthetic polymer and 10-20% clay material inoculated with a combination of colonies of Cyanophycea and colonies of Bryophytes in the form of protonemas. The material rich in organic matter is preferably black peat, blond sphagnum bog, Briere black, composts, straw, leaves, manure, tree barks, vine shoots, marc of grapes, seaweed, wood chips, saw dust, mushroom grindings, river mud or marsh mud. The clay material is preferably montmorillonite, micaceous or kaolinite clay. The substrate may also contain starch, limestone, phosphate chalk type A, phosphate chalk type B, calcareous marl, slimy sand or polder. Seeds of a higher plant species may be added to the substrate when it is applied to bare terrain. The substrate is prepared by inoculating the clay material with the combination of Cyanophycea and Bryophytes to form a bed of inoculated clay material, culturing the combination on the bed to produce a culture, drying and grinding the culture to produce a dried culture, spreading the dried culture over a new bed of clay material to produce an extended culture, drying and grinding the extended culture and mixing the dried extended culture with the material rich in organic matter and the synthetic polymer.

21 Claims, No Drawings

SUBSTRATE CONTAINING CYANOPHYCEA AND BRYOPHYTE PROTONEMAS FOR PRODUCING VEGETATION ON BARE TERRAIN

This application is a continuation of application Ser. No. 07/761,496, filed Sep. 18, 1991, now abandoned.

BACKGROUND OF THE INVENTION

The present invention relates to a biologically enriched substrate, a process for its preparation and its applications to the reclamation of pioneer vegetations.

The problem of the recreation of natural vegetation is becoming increasingly urgent in view of the slow and progressive disappearance of certain media on the scale of a country or even a continent, which makes it imperative to preserve the biocenoses.

It has thus become necessary to recreate natural vegetations in order to restore the initial vegetations that have been dislocated.

There is further observed the reduction of the quality and genetic potential provided by undomesticated wild flora; certain vegetables disappear within the biocenosis; vegetables that could have contributed to the preparation of medicines or to the future food supply or could have been used to improve certain useful plants, whether they are edible, medical or intended for industrial applications.

There are at present numerous processes in existence for the reconstitution of the disturbed phytoecological environment; however, an examination of the different solutions proposed on a world scale has lead the present inventors to conclude that no satisfactory solution has been found; whether to stabilize the sites or to plant pioneer vegetable species.

Operations of the hydraulic sowing of grass seeds into a bare inorganic soil represent at this time one of the most frequently used reclaiming processes. The seeds are initially mixed with water, fertilizers and with substances intended to physically and chemically improve the soil and with adhesive substances (alginates, cellulose derivatives, latex . . . ).

These hydraulic sowing operations do not always lead to positive results. This occurs in particular when the soil is unstable (sand, clay . . . ), in cases where abnormal dryness rises above a certain threshold (pronounced seasonal extreme dryness leading to extensive withering in the summer), also in the case of seasonal thermophilia not suitable for artificially introduced species. On the other hand, certain substrates are unstable; the coverings applied (simple deposition of an alginate, cellulose, or latex film) are fragile and in the case of abundant rain the seeds are carried away prior to their sprouting.

Finally, these methods use large quantities of fertilizers, essentially nitrogen fertilizers, in order to try to obtain in the first year good development of the seedings. But the damage caused to the environment by nitrogen fertilizers is well known at the present time, in particular due to the presence of nitrates in the phreatic layers.

Furthermore, hydraulic seeding operations are anthropic and artificial formations which cannot merge into a natural landscape.

In certain cases of conventional hydraulic seeding, partial successes are achieved, because certain plants introduced in the form of grains are well adapted. However, in this case genetic pollution occurs and there is a risk for the indigenous flora of competition for sites; in numerous cases the plant introduced prevails.

As an example, *Erigon canadensis*, a weed which appeared at the turn of the century in France, or *Elodea canadensis*, the growth of which interfered with traffic on canals in canals in England around 1930, may be mentioned. *Bacharis halimifolia* may also be cited; following its use in gardens it is about to become a plague for atlantic salt marshes or the bottom of Northern Portugal, introduced on the borders of freeways and hindering the growth of the broom (*Sarothamus scoparius*).

It is found in effect that the plants introduced do not always adapt, with the result that they regress more or less slowly. The soil becomes more or less destabilized or it recolonizes naturally, but, depending on the data of the thermoxerophilic character of the medium seeded, regression may last for 2 to 10 years and as a function of the particular case, it may take 5 to 25 years to develop natural recolonization. However, in the latter case the natural species of the recolonization will be less numerous due to the isolation of the sites relative to identical natural environments (diaspora reservoir).

It thus became necessary to resolve both the technical problem of stabilization and that of the reconstitution of plants.

The phenomenon of the colonization of soils follows an identical scheme at all latitudes and in all climates; it is more or less rapid or partial depending on the degree of dryness or the nature of erosion.

This scheme, which remains the same on the plains, at the seashore and in the mountains up to 3000 m, has succeeded in forming on our planet over approximately 400 million years the luxuriant vegetation that we know. It may for example be summarized as follows in an acid medium:

Stage 1: bare and infertile soil

Stage 2: essentially consisting of Cyanophycea (blue algae)—0.5 mm organic matter; 4 to 10 species or more, depending on the site, Stage 3: Bryophytes (mosses)—5 to 25 mm of organic matter—moder type; 3 to 6 species or more, depending site, Stage 4: Therophyte pre-sod (Bryophytes and annual plants)—high productivity of organic matter—thickness 25–70 mm—moder type; pre-sod in a phytosociology of the following classes: Festco-Brometea, Lygeo-Stipetea, Sedo-Sclerantheta, Poetea-bulbosae, Tuberarietea, Stage 5: Turf with Graminea dominating—organic matter in accumulation; thickness 60–300 mm—moder then ranker type.

All of these stages are necessary for the creation of humus (mull or moder), which constitutes the beginning of the evolution of the soils toward rankers in co-evolution with the implantation of the sod stage. It is known that it required 2000 to 3000 years to obtain alpine or atlantic rankers.

It is necessary to wait 5 to 20 years in an unstable thermo-xerophilic situation to see the first Byrophytes occupy the degraded soil. Depending on the degree of dryness; between 10 and 30 years are required to obtain a sufficiently thick soil to permit the installation of the sod.

SUMMARY OF THE INVENTION

In the course of extensive research carried out in order to reconstitute in a satisfactory manner disturbed phytoecologic media, the present inventors were able determine the fundamental importance of the stages 2, 3 and 4 mentioned above. They determined that the first condition for the implantation (natural or artificial) of pioneer colonizing species consists of establishing from the beginning a medium rich in both Cyanophycea and Bryophytes, which constitute the essential link for later colonization by vegetables.

It was discovered in this manner that it is possible to insure the rapid spontaneous stabilization and vegetalization of a bare terrain (degraded parent rock or subsoil) if within a few months a super-pioneer stage with Cyanophycea-Bryophytes combined with vegetable species forming the higher combination called pre-sod is created and the inventors have succeeded in developing a solid substrate, transported as a liquid, biologically enriched and especially well suited for this purpose.

The biologically enriched substrate according to the invention is characterized in that it essentially consists of an organic matter rich in colonies of Cyanophycea and in Bryophytes combined with an noneroding support.

DETAILED DESCRIPTION OF PREFERRED EMBODIMENTS

The use of Cyanophycea (cyano-bacteria also called "blue or green algae") to improve the soil has already been described. Thus, WO-A-87/02660 describes a composition containing among other components a mixture of photosynthetic microorganisms chosen from among algae (blue or green) and more specifically from among a group of stocks of cyanobacteria or cyanophycea. The process of multiplication of blue algae of the soil in nutrient solutions, which is also described in the reference, consists of selecting pure stocks multiplied by Zygospores. The blue algae in this case are considered stabilizing agents in themselves.

Similarly, in Reclamation and Revegetation Research, 3 (1984), 49–63, J. Ashley and S. R. Rishforth studied the growth of green and blue algae and their possible use in the recolonization of bituminous shale wastes.

The study performed by the inventors on these Cyanophycea stocks revealed that when used by themselves these algae do not make it possible to obtain satisfactory results, but that they can constitute a decisive element in the conditioning of a substrate and prepare the introduction of the Bryophytes, which then provide the basis for the reconstitution of the medium.

The process according to the invention thus consists of producing Bryophytes by taking advantage of the potentials offered by the Cyanophyceas for their proper colonization by the Bryophyte protonemas. It is thus possible to create a living substrate capable of rapid colonization as a function of the season and the application medium.

This method permits the shortening of the colonization period of lower vegetables which form the pre-sod (stage rich in Bryophyte "moss") representing more than 80% of the vegetation.

The use of this substrate makes possible the spontaneous stabilization and vegetalization of bare inorganic terrains (degraded parent rock or subsoil) by creating, in a few months, a pioneer Bryophyte stage combined with vegetable species forming the higher vegetable combination called pre-sod.

The Cyanophycea stage is important because it conditions the evolution of the medium. The Cyanophycea have a decisive role in the formation of reviviscent crusts absolutely necessary for the installation of the Bryophyte vegetation of the pre-sod.

The heterocystous Cyanophycea of these crusts play a large role in the fertilization of the media due to their ability to fix the inorganic nitrogen of the air and to convert it into assimilable nitrogen available to vegetables capable of colonizing these media.

The impermeable cover formed by the entanglement of the trichomes and cenobes of the Cyanophycea and of the polysaccharides surrounding them has an inhibiting effect on the germination of the ruderal weeds of the debris and limits the appearance of anthropic vegetation which establish themselves after the operations.

In addition to the Cyanophycea of Bryophytes, the development of which is possible only in the polysaccharide gel surrounding the Cyanophycea contributes in a decisive fashion—and this one of the original characteristics of the invention—to the development of the organic matter indispensable for the later development of higher vegetables.

The present invention makes it possible to introduce into an inorganic soil all of the necessary biological components, accompanied simultaneously and in combination by a noneroding substrate which serves to support the culture of these first vegetables.

Higher vegetable elements are introduced in the form of seeds (in a controlled number) simultaneously with the biological medium or in a later stage; these vegetable elements serve as seed carders for dynamic colonization.

In effect, in the case wherein a cultivated organic soil is available, there are no more obstacles to the growth of higher vegetables. In contrast, in situations in which the inorganic medium is too unstable for the formation of the natural scheme of colonization described above, the vegetables must undergo certain pioneer adaptations so that they will be able to accommodate themselves to this type of medium. True pioneer vegetables are adapted to the mobility of these systems and are able to draw what little they require from these inorganic materials. The following may thus be cited:

an alpine medium: the flora of the moraines and the flora of rubble also found in abyssals in the flood paths where the instability of their moraine or rubble is again present in the gravel;

in an environment of plains, plants of rubble or of overturned soil are frequently found in certain cultivated soils: Example. Tussilago-farfara in the vines.

in a maritime environment it is the flora of the mobile dunes.

The true higher pioneer vegetables are those capable of colonizing unstable inorganic media and which disappear during the stabilization of these media.

The super-pioneers (Cyanophycea and Bryophytes) are successions of lower vegetables which initiate a stabilization process accompanied by a process of fertilization by their own production (nitrogen and organic matter) and which generate a dynamic tied to the establishment of a pedological process.

Furthermore, these media are colonized very rapidly by a large number of more or less cyanophage animal microorganisms which contribute to the maintenance of the organic litter and to the liaison between the production of humus on the surface (moder) with the inorganic substrate. These are acariens, anguilulles and others that are not pathogenic for the higher flora being installed.

The substrate according to the present invention makes it possible to put in place, in 1 to 3 years, all of the floristic components of the therophyte presod according to the phytosociological classes initially present, so that the reconstituted environment will be identical with the natural medium and will not be a pale imitation of it.

The base of the noneroding substrate which is to support the culture of super-pioneer vegetables capable of colonizing inorganic media consists of a clay material into which the biological components are inoculated (Cyanophycea and Bryophytes).

The clay materials suitable for inoculation are chosen from among montmorillonites, micaceous clays (illities, vermiculites), kaolinites and the argillaceous earths called "potter's earths", such as the clays of Fuilet Maine and Loire (France).

In addition to the inoculated clay, the noneroding substrate makes it possible to create a natural pioneer vegetation which consists of materials rich in organic matter, calcareous soil ameliorators, dry starch and water retaining polymers.

The materials rich in organic matter are chosen from among the black peat said of Carex, the blond sphagnum bog, Brière black, composts, straw, leaves, manure, barks of different trees, vine shoots, marc of grapes, seaweed, wood chips and sawdust, together with all sorts of organic matters of animal or vegetable origin, composts of household wastes, composts originating with earthworms, Paris mushroom grindings, river or marsh mud.

The lime ameliorators are chosen from among limestone, phosphate chalks (type A and B), calcareous marl, slimy sand or polder. Burned lime products, such as magnesia or phosphate limes may be added (types A and B).

The starches used are advantageously chosen from among the starch ethers obtained by the modification of potato, rice and corn starch.

The water retaining polymers are chosen from among different natural or synthetic, anionic or cationic polymers having water retaining properties, such as acrylic or substituted acrylic polymers or copolymers and in particular the sodium, potassium and/or ammonium salts of said polymers or copolymers.

According to an advantageous embodiment of the invention, oligo elements (Fe, Mn, Zn, Cu B, Mo, Co . . . ) are introduced in small quantities, alone or in combinations.

All of the algae of the class of the Cyanophycea and other unicellular, parenchymatous algae may be used in the present invention, provided that their ecology is terrestrial and that they form colonies characterized by the crusts they form during dry periods. Another section criterion is that they form the first stages of colonization in hygroclinic to xerophilic situations and that they are colonized by Bryophytes in the form of protonemas.

Among the numerous species of terrestrial Cyanophycea the species belonging to the following families: Aphanocapsa, Aphanotece, Calothrix, Chlamidonomas, Chlorella, Chroococcus, Gloeothece, Lyngbya, Microcoleus, Microcystis, Nostoc, Oscillatoria, Phromidium, Rivularia, Schizothrix.

All species of Bryophytes are suitable for use, whether they are arctic, temperate or tropical.

The process of the preparation of the substrate according to the invention consists essentially of cultivating together, on a clay bed, the Cyanophycea in the form of a polyspecific combination and combinations of Bryophytes in the form of protonemas, with the two combinations conforming to the species present in the natural medium to be reclaimed, then dry and grind the culture and subsequently spread it over a new clay bed to extend the biomass. Then, after drying and grinding, materials rich in organic matters, calcareous soil ameliorators, starch and partially hydrated water retaining polymers, are incorporated.

The present invention also concerns the application of the biologically enriched substrate to the reclamation of pioneer vegetation by the inclusion in the substrate, at the moment of the expansion, of a small quantity of seeds of higher vegetal species of the pre-sod or the sod.

The process of the preparation of the substrate according to the invention will now be described in detail. It comprises essentially two stages: one preculture stage and one stage of the culture proper.

Preculture: Production of Bryophyte protonemas from stocks taken from nature

Stocks of Cyanophycea are collected from a site similar and as close as possible to the site to be reclaimed in the form of crusts, together with Bryophytes. A small portion of the crusts and the Bryophytes are cultivated for identification.

According to a preferred embodiment of the invention, the production of the protonemas takes place in a sexless way. A ground mass of leaves, twigs and rhizoids in the powder form are spread dry over a clay bed maintained humid, followed by an inoculation by the hydraulic spreading of a ground mass of identified Cyanophycea previously collected on site, as mentioned above.

In 2 to 3 weeks crusts consisting of a mixture of Cyanophycea and protonemas of Bryophytes are obtained; they are allowed to dry. According to another preferred embodiment of the invention, the protonemas are produced by a sexual method; elements of the Bryoflora of the site to be reclaimed are added in the form of spores introduced into micronized black peat, then suspended in distilled water and subsequently mixed in a proportion of 0.5% into the mixed suspension of the Cyanophycea collected on the site prior to spreading. The mixture is spread over a clay bed. The crusts are then obtained in 2 to 3 months.

The extensive culture itself—Production of inoculated clay

The argileous crust of the preculture is suspended in water to obtain a film consisting of Cyanophycea and Bryophyte protonemas. The film is passed through the mixer at a moderate speed in the presence of water to obtain microcolonies of Cyanophycea containing fragments of the Bryophyte protonemas; this mixture is then spread over pure clay in production units. After one to two weeks new argileous crusts are formed covered by a film of cyano-protonemas; this film is reusable and may serve as a mother culture in the reseeding of the next culture.

The preculture and the culture are prepared in a narrow vat with a depth of about 5 cm.

They are preferably produced in a closed building under a hortocole artificial light within a zone of 1500/3000 Lux. Good results are obtained under fluorescent tubes, such as those marketed under the OSRAM trademark, Natura type.

The biomass formed by the thalli of the cyanophycea and the Bryophyte protonemas forms crusts in the surface of the clay. The formation of buds on the protonema is awaited. This assembly is then slowly dried to a humidity content of less than 15%. After drying is complete, the crusts are collected, then reduced and ground into powder or small granules, and incorporated into lime ameliorators and starch. This assembly is mixed together directly with the other components in the "hydroseeding" vat at the time of spreading: materials rich in organic matter, water retaining polymers.

In order to obtain a rapid yield, the production proportions are multiplied by 100 (on average). As an example, to produce 100 m² of a cyanophycea biomass on 5 mm of clay, it is necessary to collect 1 m² of crusts. Series production becomes possible from the first 100 m² produced in 2 to 3 weeks. This series production is possible by the successive replantation of the polyspecific complex, which does not lose any of its potentials. At the end of the period of 2 to 3 weeks, the 5 mm thick argileous crusts are dried for their integration with the other dry components.

The quantities (in % of the total volume) of the different essential elements of the substrate support according to the invention are preferably the following:

| materials rich in organic matter | 20 to 30% |
| inoculated clay | 10 to 20% |
| lime ameliorators | 4 to 10% |
| dry starch | 2 to 6% |
| partially hydrated water retaining polymers | 40 to 60% |

However, it is obvious that this is merely a preferred embodiment of the invention and that numerous variants and combinations are possible depending on the inorganic medium, the flora to be reconstituted and mainly the microorganisms of the microflora and the Bryoflora.

The following examples illustrate the invention without limiting it.

EXAMPLE 1

Composition for an acid substrate, pH 5

| materials rich in acid organic matter, pH 3 to 4 | 26% |
| inoculated clay | 11% |
| calcareous marl | 2.9% |
| starch | 3.4% |
| partially hydrated polymers | 56.7% |

These proportions may be used as a reference for all other combinations at a pH of less than 7.

The mixture is prepared in situ directly in the vats of the hydroseeder and is agitated for 15 rain; prior to spreading, the quantities of the substrate to be spread over a hectacre are between 40 and 100 m³. For an average thickness of 6 mm in the humid state, the following are spread over one hectacre: 26 m³ of material rich in organic matter, 10 m³ inoculated clay, 2.6 m³ calcareous marl, 3 m³ dry starch, 51.5 m³ partially hydrated polymer.

An experimental application of this substrate, prepared outside in the month of February at average nocturnal temperatures of 4° C. required 3 weeks for total colonization.

EXAMPLE 2

Composition for a neutral substrate, pH 7

| materials rich in acid organic matter, pH 3 to 6 | 23% |
| inoculated clay | 11% |
| calcareous marl | 5.6% |
| starch | 3.4% |
| partially hydrated polymers | 57% |

A more precise study of each medium obviously would make possible adjustments of the support.

For an average thickness of 6 mm in the humid state, the following are spread per hectacre: 20 m³ of material rich in organic matter, 10 m³ inoculated clay, 5 m³ calcareous marl, 3 m³ dry starch, 50 m³ partially hydrated polymer.

An experimental application of this substrate, prepared outside in the month of July under average nocturnal temperatures of 20° C. required one week to be completely colonized.

In all cases, at the moment of spreading a small quantity of seeds of the higher vegetables species of the pre-sod or the sod is included.

The choice of the seeds to be introduced is made as a function of season of the spreading and the biological characteristics of the species.

If the substrate is deposited on the site in September/October, seeds of biannual species are introduced into the substrate; their germination is autumnal. Annual species, the germination whereof takes place at the end of the winter, are applied by conventional methods in the month of February.

In effect, it is not necessary as mentioned above to create a true sod by a massive introduction of seeds, as is being done by the present methods. The few seeds of each species are added only to act as "seed carriers" intended to rapidly enrich the floristic composition of the medium.

As an example, three grouped seed pieces of Vulpia bromoides, annual grass of acid pre-sod, seeded in February by means of a substrate according to the invention yielded 143 available seed grains distributed over a circle with a diameter of 40 cm. Since September, 14 seeds have germinated, predicting a covering index of 60 to 80% for the next year.

We claim:

1. A biologically enriched substrate comprising:
   (i) 20–30% of a material rich in organic matter selected from the group consisting of black peat of Carex, blond sphagnum bog, Briere black, composts, straw, leaves, manure, barks of different trees, vine shoots, marc of grapes, seaweed, wood chips, sawdust, Paris mushroom grindings, river mud and marsh mud;
   (ii) 40–60% of a synthetic polymer having water retaining properties; and
   (iii) 10–20% of a clay material inoculated with a combination of
      (A) colonies of Cyanophycea; and
      (B) colonies of Bryophytes in the form of protonemas.

2. The substrate according to claim 1 wherein the Cyanophycea are selected from the group of families consisting of Aphanocapsa, Aphanotece, Calothrix, Chlamidonomas, Chlorella, Chroococus, Gloeothece, Lyngbya, Microcoleus, Microcystis, Nostoc, Oscillatoria, Phromidium, Rivularia and Schizothrix.

3. The substrate according to claim 1 wherein the Bryophytes are arctic, temperate or tropical Bryophytes.

4. The substrate according to claim 1 further comprising a burned lime product selected from the group consisting of magnesia and phosphate limes types A and B.

5. The substrate according to claim 1 further comprising a dry starch.

6. The substrate according to claim 5 wherein said dry starch is a starch obtained by the modification of potato, rice or corn starch.

7. The substrate according to claim 1 wherein said synthetic polymer having water-retaining properties is an acrylic or substituted acrylic polymer or copolymer thereof.

8. The substrate according to claim 7 wherein said polymer is a sodium, potassium and/or ammonium salt of said water-retaining polymer or copolymer.

9. The substrate according to claim 1 further comprising calcareous ameliorators selected from the group consisting of limestone, phosphate chalks type A or B, calcareous marl, slimy sand and polder.

10. The substrate according to claim 1 wherein said clay material is a clay selected from the group consisting of montmorillonite clay, micaceous clay and kaolinite clay.

11. The substrate according to claim 1 further comprising an oligo element selected from the group consisting of Fe, Mn, Zn, Cu, B, Mo, or Co, alone or in combination.

12. The substrate according to claim 1 wherein said inoculated clay material is in particulate form.

13. The substrate according to claim 1 wherein said polymer having water retaining properties is a cationic or anionic polymer.

14. Process for the preparation of a biologically enriched substrate comprising:
 (i) 20–30% of an organic material selected from the group consisting of black peat of Carex, blond sphagnum bog, Briere black, composts, straw, leaves, manure, barks of different trees, vine shoots, marc of grapes, seaweed, wood chips, sawdust, Paris mushroom grindings, river mud and marsh mud;
 (ii) 40–60% of a synthetic polymer having water retaining properties; and
 (iii) 10–20% of a clay material inoculated with a combination of
  (A) colonies of Cyanophycea; and
  (B) colonies of Bryophytes in the form of protonemas;
said process comprising inoculating said clay material with said combination of Cyanophycea and Bryophytes in the form of protonemas to form a clay material bed, culturing the combination on the clay material bed to produce a culture, drying and grinding the culture to produce a dried culture, spreading the dried culture over a new bed of clay material to produce an extended culture, drying and grinding the extended culture and mixing the resulting extended culture with the material rich in organic matter and the synthetic polymer.

15. Process according to claim 14 wherein the protonemas used for inoculating the clay material are produced in ground leaves, twigs and rhizoids in powder form.

16. Process according to claim 14 wherein the protonemas used for inoculation are produced sexually from elements of Bryoflora of the site to be reclaimed.

17. A method for the vegetalization of bare terrain comprising applying to said bare terrain a biologically enriched substrate comprising
 (i) 20–30% of an organic material selected from the group consisting of black peat of Carex, blond sphagnum bog, Briere black, composts, straw, leaves, manure, barks of different trees, vine shoots, marc of grapes, seaweed, wood chips, sawdust, Paris mushroom grindings, river mud and marsh mud;
 (ii) 40–60% of a synthetic polymer having water retaining properties;
 (iii) 10–20% of a clay material inoculated with a combination of
  (A) colonies of Cyanophycea; and
  (B) colonies of Bryophytes in the form of protonemas.

18. The method of claim 17 wherein seeds of a higher plant species are added to the substrate when applying the substrate to said bare terrain.

19. A biologically enriched substrate comprising:
 (i) about 20 to 30% material rich in organic material selected from the group consisting of black peat, blond sphagnum bog, Briere black, composts, straw, leaves, manure, tree barks, vine shoots, marc of grapes, seaweed, wood chips, saw dust, mushroom grindings, river mud and marsh mud;
 (ii) about 40 to 60% synthetic polymer having water retaining properties;
 (iii) about 10 to 20% clay inoculated with a combination of algae and moss wherein the algae is colonies of Cyanophyceae and the moss is colonies of Bryophytes in the form of protonemas;
 (iv) about 4 to 10% lime ameliorator selected from the group consisting of limestone, phosphate chalk type A, phosphate chalk type B, calcareous marl, slimy sand and polder; and
 (v) about 2 to 6% dry starch.

20. Process for the preparation of a biologically enriched substrate comprising:
 (i) about 20 to 30% material rich in organic matter selected from the group consisting of black peat, blond sphagnum bog, Briere black, composts, straw, leaves, manure, tree barks, vine shoots, marc of grapes, seaweed, wood chips, sawdust, mushroom grindings, river mud and marsh mud;
 (ii) about 40 to 60% synthetic polymer having water retaining properties;
 (iii) about 10 to 20% clay inoculated with combination of algae and moss wherein the algae is colonies of Cyanophyce and the moss is colonies of Bryophytes in the form of protonemas; and
 (iv) about 4 to 10% lime ameliorator selected from the group consisting of limestone, phosphate chalk type A, phosphate chalk type B, calcareous marl, slimy sand and polder; and;
 (v) about 2 to 6% dry starch; said process comprising inoculating a clay bed with said combination of Cyanophyceae and Bryophytes in the form of protonemas, culturing the combination on the clay bed to produce a culture, drying and grinding the culture to produce a dried culture, spreading the dried culture over a new clay bed to produce an extended culture, drying and grinding the extended culture and mixing the resulting extended culture with the material rich in organic matter, the synthetic polymer, the lime ameliorator and the starch.

21. A method for establishing pioneer vegetation on bare soil that lacks vegetation comprising applying to the soil a biologically enriched substrate comprising
   (i) about 20 to 30% material rich in organic matter selected from the group consisting of black peat, blond sphagnum bog, Briere black, composts, straw, leaves, manure, tree barks, vine shoots, marc of grapes, seaweed, wood chips, sawdust, mushroom grindings river mud and marsh mud;
   (ii) about 40 to 60% synthetic polymer having water retaining properties;
   (iii) about 10 to 20% clay inoculated with algae and moss wherein the algae is colonies of Cyanophycea and the moss is colonies of Bryophytes in the form of protonemas
   (iv) about 4 to 10% lime ameliorator selected from the group consisting of limestone, phosphate chalk type A, phosphate chalk type B, calcareous marl, slimy sand and polder; and
   (v) about 2 to 6% dry starch; said biologically enriched substrate having further added thereto, at a moment of applying, seeds of a higher plant species.

* * * * *